(No Model.)

G. PROSSER.
FISH CATCHING DEVICE.

No. 562,851. Patented June 30, 1896.

WITNESS:
C. B. Larson,
C. Gerdt

INVENTOR
George Prosser
BY
Edgar Tate & Co.
ATTORNEYS

UNITED STATES PATENT OFFICE.

GEORGE PROSSER, OF MIDDLE ISLAND, NEW YORK.

FISH-CATCHING DEVICE.

SPECIFICATION forming part of Letters Patent No. 562,851, dated June 30, 1896.

Application filed April 16, 1896. Serial No. 587,777. (No model.)

*To all whom it may concern:*

Be it known that I, GEORGE PROSSER, a citizen of the United States, and a resident of Middle Island, in the county of Suffolk and State of New York, have invented certain new and useful Improvements in Devices for Catching Fish, of which the following is a specification, reference being had to the accompanying drawings, forming a part thereof, in which similar letters of reference indicate corresponding parts.

This invention relates to devices for catching or hooking fish; and the object thereof is to provide an improved device of this class which is adapted for use in catching or hooking large fish, and especially what are known as "game" fish; and the invention is fully disclosed in the following specification, of which the accompanying drawings form a part, in which—

Figure 1:
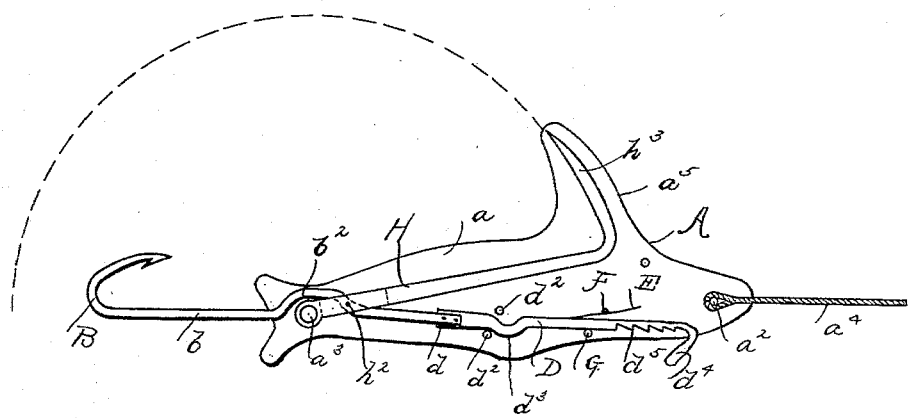
Figure 2:
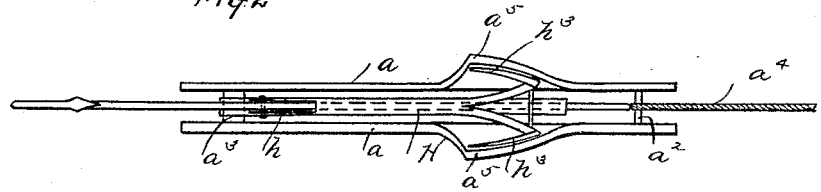
Figure 3:
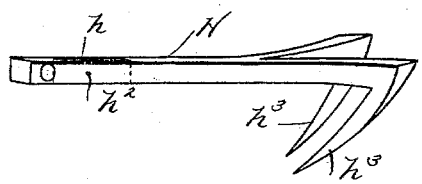

Figure 1 is a side view of my improved fish-catching device with a part of the casing which I employ removed; Fig. 2, a plan view of the device as a whole, and Fig. 3 a perspective view of a supplemental hook which I employ.

In the practice of my invention I provide a casing A, which resembles to some extent a fish when viewed from the side, and said sides or plates $a$ are connected by transverse pins or bolts $a^2$ and $a^3$. The pin $a^2$ is adapted to serve as means for attaching a line $a^4$, and I also employ a hook B, provided with a shank $b$, which passes over the pivot-pin $a^3$, and is provided at this point with a yoke or curve $b^2$, and which is projected in the direction of the end of the casing to which the line $a^4$ is secured and which is provided with an arm D, which is secured thereto at $d$ in any desired manner and which passes between guide-pins $d^2$, and which is also provided in front of said guide-pins with a curve or bend $d^3$. The arm D is extended and provided with an outwardly and backwardly curved hook $d^4$, and at its outer side with ratchet teeth or projections $d^5$, and said arm is provided with a spring E, which presses against a pin F, and on the opposite side of said arm is a corresponding pin G.

Pivotally connected with the pivot-pin $a^3$ is a supplemental hook H, which comprises a shaft having a slot $h$, through which the shank $b$ of the hook B passes, and said shank $b$ of the hook B and the shank of the hook H are pivotally connected at $h^2$, and the opposite end of the shank of the hook H is provided with two backwardly-projected prongs or barbs $h^3$, which in the normal position of the parts are concealed by upwardly and backwardly directed fins or prongs $a^5$, formed on the side plates $a$.

The normal position of the parts is that shown in dotted lines in Fig. 1, and the operation will be readily understood from the foregoing description when taken in connection with the accompanying drawings and the following statement thereof.

A bait may or may not be connected with the hook B, and the casing, which consists of the sides $a$, as hereinbefore stated, is made to represent a fish, and this device is drawn through the water in a manner well known to those familiar with the process of fishing known as "trolling." The fish to be caught will grab the hook B, or attempt to grab the casing which represents a fish, and in this event said fish will be caught on the hook B, and said hook will be drawn backwardly, and the hook H, which will be thrown in the direction of the dotted lines shown in Fig. 1, and the pins or barbs $h^3$ will be driven in the back of the fish or into the head thereof. In this operation, when the hook B is drawn backwardly to its utmost limit, the teeth or projections $d^5$ on the arm $d$ will engage with the pin G, and the hook H will be locked in the position above referred to, and said hooks B and H will securely hold the fish, as will be readily understood, and the spring E, operating upon the pin F, holds the arm D in contact with the pin G, and prevents the same from being released and the hook H from being returned to its normal position.

The backward movement of the hook B is limited by the outwardly and backwardly directed hook $d^4$ at the opposite end of the arm B, which may come in contact with the pin G, and it will thus be seen that I accomplish the object of my invention by mean of a device which is simple in construction and operation and which is comparatively inexpensive, while being well adapted to produce the result for which it is intended.

Having fully described my invention, I claim as new and desire to secure by Letters Patent—

1. In a device for catching fish, the combination with a casing which is composed of two side plates, which are formed to represent a fish, of a main hook which projects rearwardly of said plates and the shaft of which extends between the same, and is provided with an arm which projects forwardly between the plates and is provided at its end with an outwardly and backwardly curved hook which operates in connection with a pin mounted between said plates, said arm being provided with teeth or projections on its outer side and with a spring secured to its upper side which is adapted to force said arm outwardly and a supplemental hook pivotally connected with said casing adjacent to the rear end thereof, said supplemental hook being provided with a slot through which the shaft of the main hook passes and said supplemental hook and the shaft of the main hook being pivotally connected, substantially as shown and described.

2. In a device for catching fish, the combination with a casing which is composed of two side plates, which are formed to represent a fish, of a main hook which projects rearwardly of said plates and the shaft of which extends between the same, and is provided with an arm which projects forwardly between the plates and is provided at its end with an outwardly and backwardly curved hook which operates in connection with a pin mounted between said plates, said arm being provided with teeth or projections on its outer side and with a spring secured to its upper side which is adapted to force said arm outwardly and a supplemental hook pivotally connected with said casing adjacent to the rear end thereof, said supplemental hook being provided with a slot through which the shaft of the main hook passes and said supplemental hook, and the shaft of the main hook being pivotally connected, and said supplemental hook being, in the normal position of the parts, extended forwardly and provided with backwardly-directed points or prongs, substantially as shown and described.

3. In a device for catching fish, the combination with a casing which is composed of two side plates, which are formed to represent a fish, of a main hook which projects rearwardly of said plates and the shaft of which extends between the same, and is provided with an arm which projects forwardly between the plates and is provided at its end with an outwardly and backwardly curved hook which operates in connection with a pin mounted between said plates, said arm being provided with teeth or projections on its outer side and with a spring secured to its upper side which is adapted to force said arm outwardly, and a supplemental hook pivotally connected with said casing adjacent to the rear end thereof, said supplemental hook being provided with a slot through which the shaft of the main hook passes and said supplemental hook and the shaft of the main hook being pivotally connected, and said supplemental hook being, in the normal position of the parts, extended forwardly and provided with backwardly-directed points or prongs, and means connected with the casing by which a line may be secured thereto, substantially as shown and described.

4. In a device for catching fish, the combination with a casing which consists of two side plates and which is designed to represent a fish, of means for securing a line thereto, and a main hook mounted between said side plates and adapted to slide back and forth therein, said casing being also provided with a pivoted supplemental hook which is pivotally connected with the shank of said main hook, substantially as shown and described.

5. In a device for catching fish, the combination with a casing which consists of two side plates and which is designed to represent a fish, of means for securing a line thereto, and a main hook mounted between said side plates and adapted to slide back and forth therein, said casing being also provided with a pivoted supplemental hook which is pivotally connected with the shank of said main hook, and said main hook being provided with a forwardly-directed arm which passes between suitable guides or keepers and which is provided at one side with teeth or projections and at its end with a backwardly-curved hook or projection, and at the opposite side with a spring which operates in connection with a pin mounted in said casing, and said teeth or projections being adapted to operate in connection with another pin which is also secured to said casing, substantially as shown and described.

In testimony that I claim the foregoing as my invention I have signed my name, in presence of the subscribing witnesses, this 9th day of April, 1896.

GEORGE PROSSER.

Witnesses:
FLORENCE VIRGINIA BAYLES,
GEORGE HENRY BRAMWELL.